Figure 1:
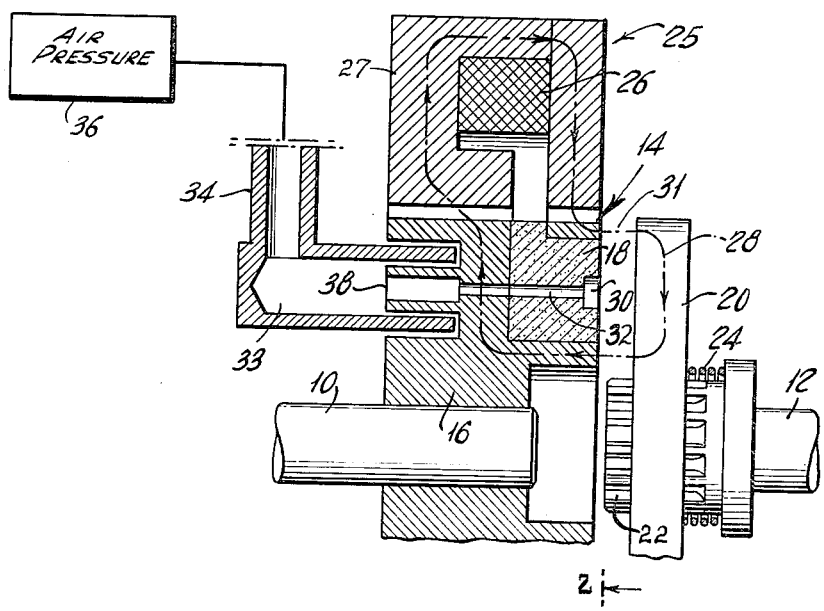

Sept. 14, 1965  G. E. COMSTOCK, 3D  3,205,990

FAST ACTING CLUTCH-BRAKE

Filed May 17, 1963

INVENTOR.
GEORGE E. COMSTOCK, 3d
BY
Douglas M. Clarkson
ATTORNEY

United States Patent Office 3,205,990
Patented Sept. 14, 1965

3,205,990
FAST ACTING CLUTCH-BRAKE
George E. Comstock 3rd, Huntington, N.Y., assignor to Potter Instrument Company, Inc., Plainview, N.Y., a corporation of New York
Filed May 17, 1963, Ser. No. 281,170
7 Claims. (Cl. 192—84)

This invention relates to clutches and, more particularly, to a fast-acting clutch having improved stable, operating characteristics with low maintenance.

Electromagnetically actuated, disc type friction clutches are known and are used for many mechanisms such as paper advance mechanisms in printers, capstan drive mechanisms in tape handlers, and the like.

In such structures generally, brakes and clutches differ only in that one clutch plate is rotated in the former and is clamped in the latter. For this reason, in this application the word "clutch" shall apply to both clutches and brakes.

In general, the armature of the electromagnet is one of the friction members of such clutches to simplify the construction and to obtain direct actuation of the friction member thereby minimizing time delays in actuation. In many uses, it is desirable to hold the armature at a predetermined small distance from the mating friction surface to obtain short actuation time.

In one construction known to the art, the clearance between the clutch plates has been provided by mounting the armature on a deflectable diaphragm having low axial stiffness to permit the armature to engage easily by axial movement and having high torsional stiffness for transmission of the torque load. Usually, a clearance of a few mils is provided between the frictional surfaces when de-energized to minimize wear when disengaged and to provide an acceptably short actuation time.

With such construction, it has been found difficult to set the gap to a few mils and, since in any event the clutch faces will wear during use, a preset clearance will change during use. For this reason, the actuation delay time changes as the clutch is used and, with extreme wear, the drive torque is reduced since the net normal force available for engagement of the plates is reduced by the diaphragm suspension spring force.

To overcome these difficulties, the art has provided a construction in which the armature is floated on a spline and is forced against the mating friction surface with a light spring acting in the axial direction. As a result, continuous contact is provided thereby giving minimum delay in actuation time and automatically compensating for wear since the friction surface is urged into physical engagement.

However, the continuous engagement accelerates the wear of the mating surfaces. In addition, the rubbing contact produces noise, often results in glazing of the friction surfaces, and increases the ambient operating temperatures of such clutches.

Therefore, it is a primary object of this invention to provide an improved clutch having a short actuation time, stable operating characteristics, and low wear.

In accordance with this object and other objects as will become apparent, a field plate is mounted on a hub, and further, in accordance with a preferred embodiment of this invention, the hub is coupled to a shaft which may rotate or be clamped, depending upon the installation. The field plate has an annular band of friction material.

A clutch armature is supported on an independent shaft and is attached thereto by means of a splined hub. Thus, the armature is secured to the shaft rotationally but is free to move axially.

The armature is urged into frictional engagement with the field plate by a spring. A magnetic coil is provided to establish a magnetic field extending through both the field plate and the armature to develop an attractive force between the two elements to engage the elements.

The field plate is provided with a plurality of cavities or pads in the face thereof, each of which cavities communicate with a source of air. Air is pumped into the cavities thereby to establish an air pad, spacing the armature from the rotor during idling which pad can, however, be overcome by the magnetic attractive force during energizing of the coil. In this manner, air pressure separates the clutch plate from the rotor to prevent frictional wear during idling. Moreover, this separation can easily be maintained very small to ensure a very short energizing time on application of a magnetic field linking the field plate and armature.

Figure 2:
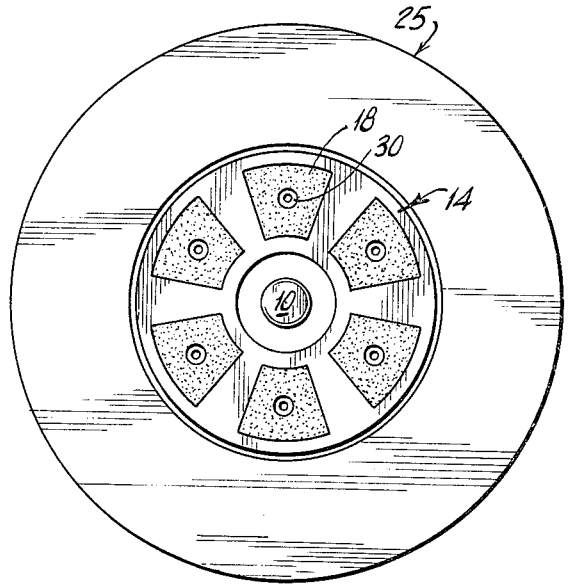

Having briefly described this invention, it will be described in greater detail, along with other objects and advantages thereof, in the following detailed description which may best be understood by reference to the accompanying figures, in which:

FIG. 1 is a partially sectioned view of a clutch constructed in accordance with the present invention; and FIG. 2 is a view taken along lines 2—2 in FIG. 1.

In the figures, there is shown a clutch consisting of a first shaft 10 and a second shaft 12. A clutch rotor field plate assembly 14 is mounted on the shaft by a hub 16 and is provided with an annular band of frictional material 18.

On the shaft 12, an armature 20 is mounted by means of a splined hub 22 which engages with the internal splines in the armature 20 to couple the armature 20 to the shaft 12 in a rotational sense, but to permit the armature 20 to move axially on the shaft 12. A spring 24 urges the armature 20 to the left as viewed in FIG. 1 into engagement with the frictional material 18.

A coil assembly 25 is formed with windings 26 enclosed within a cavity in a core 27 to selectively establish a magnetic flux, indicated by lines 28, linking the armature 20 and the field plate assembly 14, to induce a force urging the armature 20 into engagement with the frictional material 18.

In order to prevent the armature 20 from wearing contact with the frictional material 18 in the de-energized state (during idle), a plurality of air chambers 30 are spaced about the rotor face. While these chambers 30 may be located in any desired position, they are shown in a substantially symmetrical location, as best seen in FIG. 2.

Each of the chambers 30 communicates through an orifice 32 opening within an annular header 33. The header 33, in turn, is supplied through a pipe 34 with air under pressure from an air pump 36. To prevent excessive air leakage between the header 33 and the orifice 32, a suitable seal such as a rotary, labyrinth seal 38 is utilized, as indicated.

The air pressure that is developed within the chambers 30 must be sufficiently high so that the total force (pressure times total area of pads) will overcome the urging force of the spring 24, thereby to ensure positive separation between the armature and the rotor. This total air force, conveniently regulated by the air pressure, determines the magnitude of the separation, indicated by the numeral 31, which separation may be adjusted easily to an extremely small separation, such as a few mils. Thus, during idle, the armature 20 is separated from the rotor field plate assembly 14.

The cushion of air distributes itself uniformly between the separation 31 and will act to maintain parallel alignment of the mating faces. That is, should the armature 20 tend to tilt, the air cushion will decrease on the wide-gap side and increase on the narrow-gap side to exert a restoring torque. For these reasons, very close, but positive clearance can be achieved.

However, when the coil is energized, the electromagnetic attraction force will overcome the force of the air cushion, thereby to cause the armature 20 to engage with the rotor assembly 14 to couple torque from the shaft 10 to the shaft 12. Since this separation 31 can be held at a predetermined, extremely small magnitude, the actuation time can be maintained exceptionally short.

Thus, by this construction, a positive separation of very small dimension, such as a few mils, can be maintained easily, and the clutch will not wear during idle. However, the small separation is overcome very rapidly by the electromagnetic force, and quick actuation time can be obtained.

Further, the separation is determined by the air cushions which are established using the face of the rotor 14 as a reference position. Therefore, clutch wear will not change the clearance that is developed repeatedly, and the operating characteristics of the clutch will remain the same throughout use. In this manner, there is no need for maintenance to readjust the clearance.

While it is not illustrated in the drawings, it will be understood readily that suitable means, such as lugs, may be formed integrally with the assembly 25 to extend outwardly for mounting the device.

This invention may be variously modified and embodied within the scope of the subjoined claims.

What is claimed is:
1. A very fast acting clutch comprising,
 a first shaft supported for rotation,
 a rotor field plate mounted on the first shaft for rotation therewith,
 the rotor field plate including an annular face of frictional material,
 a second shaft supported for rotation,
 an electromagnetically attractable armature mounted on the second shaft for conjoint rotation therewith but being axially displaceable with respect thereto,
 spring means urging the armature toward the field plate for engagement therewith,
 a coil assembly positioned to establish an electromagnetic field to attract the armature into frictional engagement with the field plate, and
 means to separate the armature from the field plate, when de-energized, by a very small clearance,
said last named means comprising,
 means for establishing an air cushion between said field plate and said armature.
2. A very fast acting clutch in accordance with claim 1 in which a plurality of air chambers are formed in the face of the rotor field plate and which includes means for introducing air under pressure into each of said chambers.
3. A very fast acting clutch in accordance with claim 2 in which the air chambers are located substantially symmetrically in the face of frictional material to exert sufficient force to overcome the spring force and in turn can be overcome by said electromagnetic force.
4. A very fast acting clutch comprising,
 a first shaft supported for rotation,
 a second shaft supported for rotation,
 a clutch armature mounted on the second shaft by means of axially extending splines to permit relative axial movement of the armature with substantially no relative rotational movement,
 a rotor field plate mounted on the first shaft for rotation therewith,
 the rotor field plate having an annular frictional face,
 spring means urging the armature into frictional engagement with the annular frictional face,
 the rotor field plate being provided with a plurality of air chambers in the face thereof,
 a header including means for connection with a source of air pressure,
 means defining a plurality of orifices coupling the header to each of the air chambers,
 the orifices including rotating seal means, an air pump to supply air under pressure to the header to pressurize the air chambers to overcome the spring force and to separate the armature from the field plate by a predetermined small gap, and
 coil assembly means to establish a magnetic field both through the field plate and the armature to overcome the air pressure and to move the armature into engagement with the frictional face.
5. A very fast acting clutch in accordance with claim 4 in which the coil assembly means includes an annular core fitted closely in magnetic field-applying relationship with the rotor field plate.
6. A very fast acting clutch in accordance with claim 5 in which the annular core is provided with a cavity to receive and substantially enclose a winding.
7. A very fast acting clutch in accordance with claim 4 in which the air chambers are located substantially symmetrically about the rotor field plate to prevent a tendency of tilt between the adjacent surfaces of the rotor field plate and the armature.

References Cited by the Examiner

UNITED STATES PATENTS 2,695,695  11/54  Gilfillan et al. _____ 192—84
2,956,659  10/60  Grant _____ 192—90 X DON A. WAITE, *Primary Examiner.*

DAVID J. WILLIAMOWSKY, *Examiner.*